US007014117B2

(12) United States Patent
Steinmetz et al.

(10) Patent No.: US 7,014,117 B2
(45) Date of Patent: Mar. 21, 2006

(54) COMBINATION HANDHELD SEALER/WIRELESS SCANNING/IMAGING DEVICE

(75) Inventors: Jay Steinmetz, Baltimore, MD (US); James Joseph Stubel, Baltimore, MD (US)

(73) Assignee: Barcoding, Inc., Baltimore, MD (US)

( * ) Notice: Subject to any disclaimer, the term of this patent is extended or adjusted under 35 U.S.C. 154(b) by 0 days.

(21) Appl. No.: 10/781,741

(22) Filed: Feb. 20, 2004

(65) Prior Publication Data

US 2005/0184160 A1 Aug. 25, 2005

(51) Int. Cl.
*G06K 7/10* (2006.01)

(52) U.S. Cl. .................................. 235/472.02; 235/432

(58) Field of Classification Search ................ 235/383, 235/472.1, 385, 462, 432, 433, 454, 462.01–462.47, 235/472.01, 472.02, 472.03, 382, 456; 156/64, 156/363, 249, 285, 541, 577, 579
See application file for complete search history.

(56) References Cited

U.S. PATENT DOCUMENTS 4,084,742 A * 4/1978 Silverman ................... 235/383
4,451,323 A * 5/1984 Sato et al. .................. 156/541
5,425,823 A * 6/1995 Woodside, III .............. 156/64
5,448,046 A * 9/1995 Swartz ....................... 235/432
6,170,746 B1 * 1/2001 Brook et al. ................ 235/385
6,308,888 B1 * 10/2001 Swartz ....................... 235/385
6,430,306 B1 * 8/2002 Slocum et al. .............. 382/118
6,644,549 B1 * 11/2003 Swartz .................. 235/472.01
6,736,315 B1 * 5/2004 Swartz ....................... 235/383
6,841,018 B1 * 1/2005 Pituch et al. ................. 156/64
2003/0080189 A1 * 5/2003 Patel et al. ................. 235/454
2004/0000369 A1 * 1/2004 Pituch et al. ................. 156/64

* cited by examiner

*Primary Examiner*—Thien M. Le
(74) *Attorney, Agent, or Firm*—Townsend & Banta

(57) ABSTRACT

A combination handheld package sealer/wireless scanning/imaging device is provided, having a housing (with a handle thereon), a sealer coupled therewith, and a wireless scanning/imaging device coupled therewith. A user of the device herein may simultaneously seal a package, record package identification and condition data, and transmit said data to a central station via a communication network. Further, a method of preparing a package for shipment using the combination handheld adhesive applicator/wireless scanning/imaging device is provided, as well as a system incorporating same, and a computer program product embodied therein and on a central station for storing and analyzing the data recorded using the device.

8 Claims, 3 Drawing Sheets

COMBINATION HANDHELD SEALER/WIRELESS SCANNING/IMAGING DEVICE

FIELD OF THE INVENTION

The present invention provides a combination handheld device for sealing a package to be shipped, as well as recording identification information placed therein or thereon, and recording the condition of the package. In particular, a handheld device is provided having a sealer and wireless scanning/imaging device attached thereto, as well as a method for efficiently sealing and recording said identification and condition data, and system utilizing same.

BACKGROUND OF THE INVENTION

Bar codes have been conventionally used to identify goods, as well as the manufacturer/producer thereof. Bar codes come in a variety of types and formats, such as one-dimensional codes (in which the graphical pattern of a car code contains meaningful data when scanned in one dimension), Universal Product Codes (UPC), two dimensional codes, three dimensional codes (radio frequency codes), POSTNET schemes, etc.

Bar codes have been widely used to enable the tracking of inventory, to identify a product for re-stocking, to determine the price of an item at the time of sale, to monitor the status of shipment or delivery (by tracking its location), etc. This usually requires scanning of the bar code manually, using a handheld bar code scanner.

In actual use, when a package, such as a shipping carton, box, etc., is packed at a warehouse, it is necessary to both seal the box and record identification information printed on or attached thereto or within. Identification on the package may include one or more barcode labels, RFID tags, or human readable characters. Identification in the box may include RFID tags. In addition, it is sometimes necessary to record the condition of the box itself.

Conventionally, each of the above procedures (i.e., sealing of the box, scanning of the bar code attached thereto, and recordation of the box condition) is performed separately. This requires a warehouse employee or employees to utilize two or more handheld devices to prepare the package for shipment. For example, a handheld dispenser is used to seal the package, a handheld wireless scanner is used to record the identification information of the package, and a digital camera/imager is used to record the condition of the package before shipment thereof. This separation of steps in the preparation of a package for shipment is very time consuming and inefficient, as the warehouse employee must repeatedly switch back and forth between handheld devices.

As such, it is a first object of the invention to provide a single handheld device which can perform all of the above procedures, so as to allow for more efficient preparation of packages for shipment. It is a second object of the invention to provide an efficient method of preparation of a package for shipment, comprising sealing of the package, and recording the identification and condition information of a package, via a single handheld device. It is a third object of the invention to provide a system capable of collecting at a central station package identification and condition data from one or more handheld sealer/wireless scanning/imaging devices over a communication network.

SUMMARY OF THE INVENTION

In order to achieve the objects of the present invention as described above, the present invention provides, in a first embodiment, a combination handheld sealer/wireless scanning/imaging device comprising:

(a) a housing having a hand grip thereon;

(b) a wireless scanning device operable to scan a bar code for generating an electronic response of the bar code and obtain identification information, said wireless scanning device being coupled to said housing; and (c) an adhesive applicator operable to apply adhesive material, said adhesive applicator being coupled to said housing.

In a second embodiment of the present invention, the combination handheld sealer/wireless scanning/imaging device according to the first embodiment above is provided, further comprising a digital image recording device coupled to said housing.

In a third embodiment of the present invention, the combination handheld sealer/wireless scanning/imaging device according to the first embodiment above is provided, further comprising a transmitting portion operable to transmit identification information and/or digital images from said combination handheld adhesive applicator/wireless scanning/imaging device to a central station over a communication network In a fourth embodiment of the present invention, a combination handheld sealer/wireless scanning/imaging device is provided comprising:

(a) a handle assembly having an outer portion comprising a base, a grip portion adjacent said base, and a head portion adjacent said grip portion, and an inner portion defining a battery compartment;

(b) a frame attached to the head portion of said handle assembly, said frame having two or more recesses formed therein;

(c) a wireless scanning/imaging device mounted within a recess provided in said frame; and (d) a carton sealer mounted within a recess provided in said frame.

In a fifth embodiment of the present invention, the combination handheld sealer/wireless scanning/imaging device according to the first embodiment above is provided, further comprising an antenna conductively connected with said wireless scanning/imaging device.

In a sixth embodiment of the present invention, the combination handheld sealer/wireless scanning/imaging device according to the fourth embodiment above is provided, wherein said carton sealer is a tape dispenser.

In a seventh embodiment of the present invention, the combination handheld sealer/wireless scanning/imaging device of the fourth embodiment above is provided, wherein said carton sealer is a stapler.

In an eighth embodiment of the present invention, the combination handheld sealer/wireless scanning/imaging device according to the fourth embodiment above is provided, wherein said carton sealer is a glue gun.

In a ninth embodiment of the present invention, the combination handheld sealer/wireless scanning/imaging device according to the fourth embodiment above is provided, further comprising one or more electrical contacts disposed upon the base of said handle assembly, and in electrical connection with said battery compartment, wherein a battery placed within said battery compartment may be recharged by a power source via said electrical contacts.

In a tenth embodiment of the present invention, the combination handheld sealer/wireless scanning/imaging device of the fourth embodiment above is provided, wherein said wireless scanning/imaging device comprises a wireless scanning unit comprising one or more of a laser scanner, a long range laser scanner, a charged coupled device (CCD) scanner, an RFID scanner, and an optical imager.

In an eleventh embodiment of the present invention, a method of preparing a package for shipment using a combination handheld sealer/wireless scanning/imaging device is provided, said method comprising the steps of:

(a) sealing said package via a sealer provided on said combination handheld adhesive applicator/wireless scanning device; and (b) recording identification information provided on or in said package via said wireless scanning device.

In a twelfth embodiment of the present invention, the method of preparing a package for shipment using a combination handheld adhesive applicator/wireless scanning device according to the eleventh embodiment above is provided, further comprising:

(c) recording a digital image of the package via the wireless scanning/imaging device, so as to record a digital image of package at the time of shipment to ascertain the condition thereof.

In a thirteenth embodiment of the present invention, the method of preparing a package for shipment using a combination handheld adhesive applicator/wireless scanning device according to the eleventh embodiment above is provided, further comprising:

(d) transmitting said identification information and/or said digital image from said combination handheld adhesive applicator/wireless scanning/imaging device to a central station over a communication network.

In a fourteenth embodiment of the present invention, the method of preparing a package for shipment using a combination handheld adhesive applicator/wireless scanning/imaging device according to the eleventh embodiment above is provided, further comprising:

(e) storing said identification information in a database via communication with said central station.

In a fifteenth embodiment of the present invention, the method of preparing a package for shipment using a combination handheld adhesive applicator/wireless scanning/imaging device according to the eleventh embodiment above is provided, wherein said communication network comprises at least one of a wireless local area network (WLAN), wireless wide area network (WWAN), In a sixteenth embodiment of the present invention, the method of preparing a package for shipment using a combination handheld sealer/wireless scanning/imaging device according to the eleventh embodiment above is provided, wherein said sealer is a tape dispenser.

In a seventeenth embodiment of the present invention, the method of preparing a package for shipment using a combination handheld sealer/wireless scanning/imaging device according to the eleventh embodiment above is provided, wherein said sealer is a stapler.

In an eighteenth embodiment of the present invention, the method of preparing a package for shipment using a combination handheld sealer/wireless scanning/imaging device according to the eleventh embodiment above is provided, wherein said sealer is a glue gun.

In a nineteenth embodiment of the present invention, a system operative to collect and store carton identification information and condition at a central station is provided comprising:

a central station operative to receive and store package identification and condition information from at least one combination handheld sealer/wireless scanning/imaging device over a communication network.

In a twentieth embodiment of the present invention, a computer program product embodied on a computer readable medium comprising program logic for centrally collecting and analyzing package identification and condition information is provided, comprising:

a receiving means for enabling a computer to receive package identification and condition information from at least one wireless scanning/imaging device over a communication network at a central station; and analyzing means for enabling a computer to analyze and store said package identification and condition information at said central station, responsive to said receiving means.

DETAILED DESCRIPTION OF THE INVENTION

Figure 1:
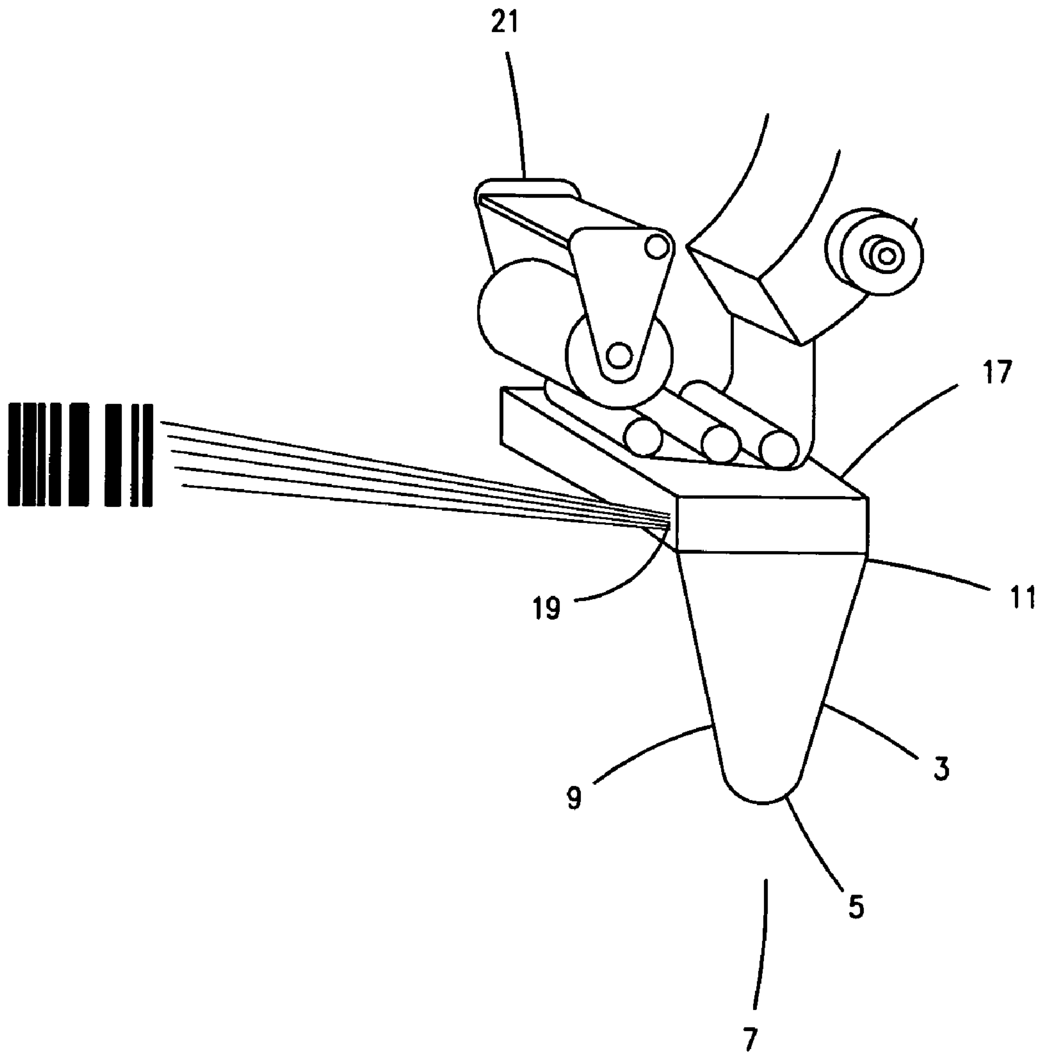
FIG. 1 is a perspective view of the handheld sealer/wireless scanning/imaging device of the present invention.
Figure 2:
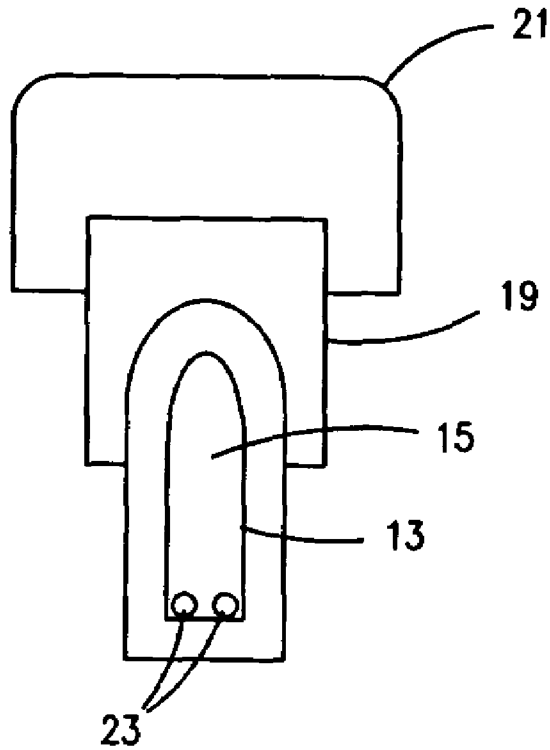
FIG. 2 is a bottom view of the handheld sealer/wireless scanning/imaging device of the present invention, illustrating the battery door located on the handle assembly of the device of the present invention.
Figure 3:
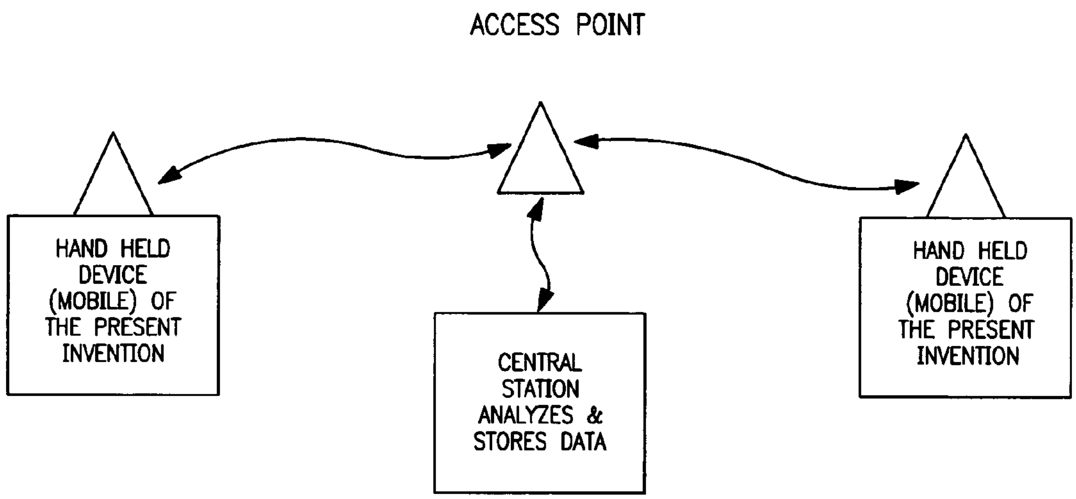
FIG. 3 is a box diagram/flow chart illustrating the system operative to collect and store carton identification information and condition at a central station, according to the present invention.

As illustrated in FIG. 1, the handheld sealer/wireless scanning/imaging device of the present invention 1, comprises a handle assembly 3 having an outer portion 5. The outer portion 5 consists of a base 7, a grip portion 9 adjacent the base 7, and a head portion 11 adjacent the grip portion 9. Further, as shown in FIG. 2, the handle assembly 3 has an inner portion 13, which defines a battery compartment 15. The battery compartment 15 may have a door thereon to secure the battery within the battery compartment 15, or may use other securing means within the battery compartment 15, such as notch and groove system, to perform said function.

A frame 17 is attached to the head portion 11 of the handle assembly 3. Two or more recesses or mounting compartments are formed in the frame 17. A wireless scanning/imaging device 19 is mounted within one of the recesses/mounting compartments provided in the frame 17. In addition, a carton sealer 21 is mounted within one of the recesses/mounting compartments provided in the frame 17. Both the wireless scanning/imaging device 19 and the carton sealer 21 may be removably or permanently mounted within the frame 17.

The combination handheld sealer/wireless scanning/imaging device may further have an antenna mounted in or on any portion thereof, so long as it is conductively connected with said wireless scanning/imaging device 19. This antenna allows the wireless scanning/imaging device to communicate via a wireless communication network with a central station.

The carton sealer 21 mounted within said frame 17 is a device capable of applying an adhesive composition or material to a package to be shipped, so as to seal same. For example, the carton sealer 21 may be a tape dispenser, stapler, or glue gun. The carton sealer 21 is mounted in such a fashion as to allow replenishment of the adhesive composition or material, i.e., to allow reloading/resupply of tape, glue, etc., without removal of the carton sealer 21 from the device 1.

Further, the combination handheld sealer/wireless scanning/imaging device 1 of has one or more electrical contacts 23, as shown in FIG. 2, disposed upon the base 7 of said handle assembly 3, and in electrical connection with said battery compartment 15. The placement of the electrical contacts 23 on the device 1 are made so as to allow a battery placed within said battery compartment 15 to be recharged by an external power source via the electrical contacts.

The wireless scanning/imaging device 19 is comprised of one or more of a laser scanner, a long range laser scanner, a charged coupled device (CCD) scanner, an RFID scanner, and an optical imager. Importantly, the wireless scanning/imaging device must be capable of reading an RFID tag, barcode label and/or human readable characters, and storing said data obtained from reading thereof within the handheld device and/or communicating the data to a central station via a communication network. In addition, the wireless scanning/imaging device 19 may include a digital imaging device, such as a digital camera, for recording and transmitting the condition of the package before shipment.

In a further embodiment of the present invention, a method of preparing a package for shipment using the combination handheld sealer/wireless scanning/imaging device 1 described above is provided. In particular, this method of the present invention comprising sealing a package via a sealer provided on the combination handheld adhesive applicator/wireless scanning device; and recording identification information provided on or in said package via said wireless scanning device. Further, a digital image of the package may be recorded via the wireless scanning/imaging device 1, so as to record a digital image of package at the time of shipment. This allows for the shipper thereof to accurately record the condition thereof, without use of a separate handheld device.

In addition, the method of preparing a package for shipment using a combination handheld adhesive applicator/wireless scanning device according described above may further comprise transmitting the identification information and/or the digital image recorded by the combination handheld adhesive applicator/wireless scanning/imaging device 1 to a central station over a communication network The package identification and condition information may then be recorded and stored in a database within or in communication with the central station.

The communication network utilized by the handheld adhesive applicator/wireless scanning/imaging device may be a wireless local area network (WLAN) or a wireless wide area network (WWAN).

Lastly, a computer program product embodied on a computer readable medium comprising program logic for centrally collecting and analyzing package identification and condition information is provided in the present invention. This computer program product is comprised of a receiving means for enabling a computer to receive package identification and condition information from at least one combination handheld sealer/wireless scanning/imaging device 1 over a communication network at a central station, and analyzing means for enabling a computer to analyze and store the package identification and condition information at the central station, responsive to said receiving means.

In particular, the computer program product embodiment of the present invention provides an application program running on a central station. This application program can receive package identification and condition date from the handheld sealer/wireless scanning/imaging devices 1 of the present invention by a wireless communications protocol. Alternatively, the devices 1 may communicate with the central station by wired communications protocol linked to distinct wireless signal relaying devices, such as an access point. The incoming data can be stored in a database for future reference, such as for confirming shipment, tracking the shipment time and/or place, for recording the package condition at time of shipment, etc.

In summary, the use of the combination handheld sealer/wireless scanning/imaging device of the present invention allows a user thereof to achieve the tasks of sealing packages for shipping, while also recording identification information via a wireless scanning device, as well as recording a digital image of the package. In addition, optionally, a geographical positioning device may be coupled to the device, to allow a determination of the exact location of the device at a precise time, so as to allow a central station to maintain a precise and accurate database of inventory.

What is claimed is:

1. A combination handheld sealer/wireless scanning/imaging device comprising:

(a) a handle assembly having an outer portion comprising a base, a grip portion adjacent said base, and a head portion adjacent said grip portion, and an inner portion defining a battery compartment;

(b) a frame attached to the head portion of said handle assembly, said frame having two or more recesses formed therein;

(c) a wireless scanning/imaging device mounted within a recess provided in said frame; and (d) a carton sealer mounted within a recess provided in said frame.

2. The combination handheld sealer/wireless scanning/imaging device of claim 1, further comprising an antenna conductively connected with said wireless scanning/imaging device.

3. The combination handheld sealer/wireless scanning/imaging device of claim 1, wherein said carton sealer is a tape dispenser.

4. The combination handheld sealer/wireless scanning/imaging device of claim 1, wherein said carton sealer is a stapler.

5. The combination handheld sealer/wireless scanning/imaging device of claim 1, wherein said carton sealer is a glue gun.

6. The combination handheld sealer/wireless scanning/imaging device of claim 1, further comprising one or more electrical contacts disposed upon the base of said handle assembly, and in electrical connection with said battery compartment, wherein a battery placed within said battery compartment may be recharged by a power source via said electrical contacts.

7. The combination handheld sealer/wireless scanning/imaging device of claim 1, wherein said wireless scanning/imaging device comprises a wireless scanning unit comprising one or more of a laser scanner, a long range laser scanner, a charged coupled device (CCD) scanner, an RFID scanner, and an optical imager.

8. A method of preparing a package for shipment using a combination handheld sealer/wireless scanning/imaging device, said method comprising the steps of:

(a) sealing said package via a sealer provided on said combination handheld adhesive applicator/wireless scanning device; and (b) recording identification information provided on or in said package via said wireless scanning device, wherein said sealer is a tape dispenser, stapler or glue gun.

* * * * *